April 5, 1960
B. B. JOHNSTON
2,931,124
FISHING BOBBER
Filed May 18, 1959
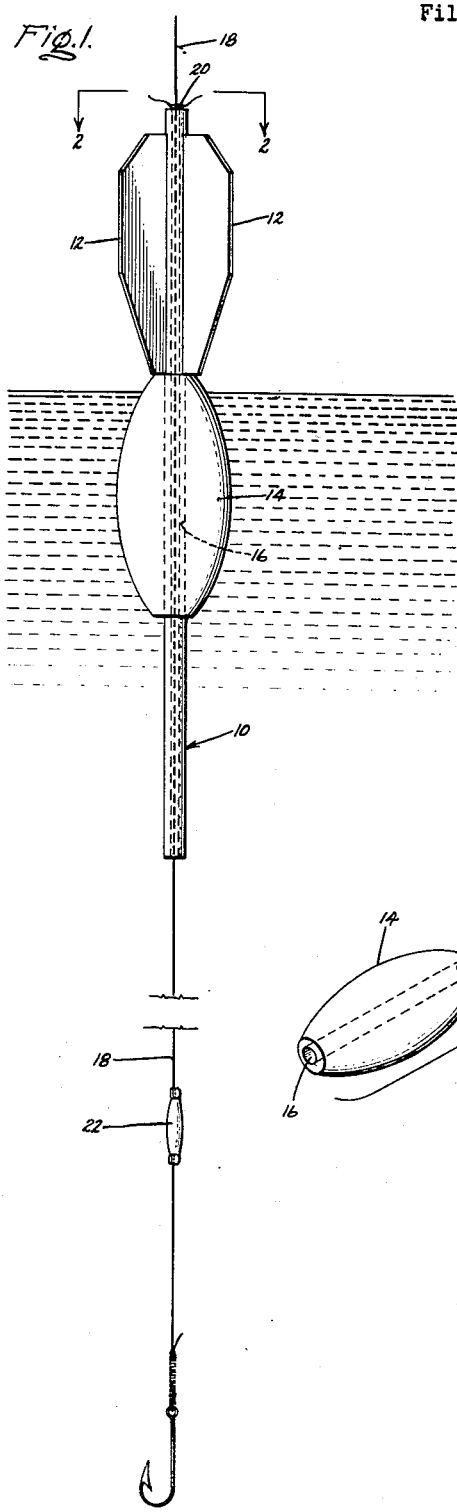
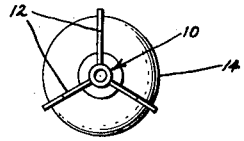
Inventor:
Buford B. Johnston,
by Just & Irish
Attorney.

United States Patent Office 2,931,124
Patented Apr. 5, 1960

2,931,124

FISHING BOBBER

Buford B. Johnston, Fort Wayne, Ind.

Application May 18, 1959, Serial No. 813,724

2 Claims. (Cl. 43—44.9)

The present invention relates to an improved fishing bobber, and more particularly to a fishing bobber having particular utility in connection with still spinfishing.

Still fishing is one of the most popular forms of the fishing sport and is conventionally performed by the use of a relatively long, flexible pole having a length, for example, of ten to twelve feet. When performed from a boat, the boat is anchored in water of suitable depth and a cork is fastened to the fishing line at a suitable fishing depth. The line is weighted sufficiently to cause the cork to stand upright in the water, so that when a fish attacks the bait, the cork will submerge, indicating to the fisherman that he should pull up on the line.

Since it is customary to fish with two or more such poles from a boat, the poles are usually laid across the boat gunwales so as to extend outwardly over the water. If the water should happen to be rough, rocking of the boat causes vertical movement of the pole, and if this movement is extensive, the fishing line is spasmodically jerked, thereby causing a similar jerking of the fishing line and bait. This movement discourages fish from attacking the bait and thereby interferes with the chances of catching fish.

The present invention is primarily concerned with using a spinning rod to still-fish instead of the still-fishing pole just described. The spinning rod is used to cast the bait a substantial distance from the boat such that enough slack line is payed out to absorb rod motion due to rocking of the boat, whereby jerking of the bobber and bait are eliminated. Since it is difficult to cast a line having a bobber secured thereon at fishing depth, considerable skill on the part of the fisherman is required. Even the skilled fisherman in some instances must attempt several casts before the line is thrown out a sufficient distance.

In view of the foregoing, it is an object of this invention to provide a bobber which facilitates the casting of a line out into the water a desired distance, the bobber being movable to the desired depth after the casting operation is completed.

Still another object of this invention is to provide a bobber for use in still fishing, which maintains a bait at a proper depth but which does not need to be tied or otherwise securely fastened to the line.

It is yet another object of this invention to provide a bobber which presents very little resistance to being submerged when a fish attacks the bait yet is clearly visible at relatively great distances from the fisherman.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is an illustration of one embodiment of this invention shown as being used in a preferred manner;

Fig. 2 is an end view thereof taken substantially along section line 2—2 of Fig. 1; and Fig. 3 is an exploded view illustrating the manner in which one embodiment of the bobber may be assembled and disassembled.

Referring to the drawings, the bobber comprises an elongated stem 10 which is hollow and preferably fabricated of plastic material. This plastic material is of the denser type which is non-buoyant, or in other words has a specific gravity greater than one. As is seen in Fig. 1, the upper one-third of the stem is provided with opaque plastic or the like fins 12, in the present instance there being three such fins spaced approximately 120° apart as shown in Fig. 2. These fins 12 are preferably made of sheet-plastic material of sufficient density to be non-buoyant. The fins are edge mounted on the upper one-third portion of the stem and extend axially of the latter.

A buoyant body or float 14 formed of cork, plastic or the like is mounted on the stem immediately below the fins 12 and in the preferred embodiment has a length equal to substantially one-third of that of the stem. The float is circular in cross-section and may be of part-elliptical shape. A coaxial bore 16 through the float has a diameter substantially equal to the outer diameter of the stem 10 such that the float may be frictionally telescoped over the stem to a desired position, such as that shown in Fig. 1.

As illustrated in Fig. 1, the lower one-third of the stem 10 protrudes beyond the float 14 so as to provide a moment arm which at least partially counterbalances the weight of the upper stem end and the fins 12. By means of this counterbalancing, the bobber will have no tendency to invert in the water.

In use, a fishing line 18 with which the bobber is to be used is provided with a frictional stop 20 consisting of a short length of suitable line tied tightly around the line 18; this stop or knot 20 is, however, loose enough that it may be slidably adjusted to a suitable depth on the line 18. The line 18 passes through the hollow stem and receives on its lower end a sinker 22 having a weight which submerges the body 14 to a point just short of the upper end thereof. This preferred position is shown in Fig. 1. By reason of the lower portion of the stem protruding from the body 14, the bobber will be maintained upright in the water due to the weight of the sinker 22 on the line 18.

The knot or stop 20 on the line 18 is made sufficiently large that it will not pass through the stem 10, but on the other hand is sufficiently small that it will pass through the mechanism of an ordinary spinning reel. Thus, when it is desired to cast the line to a point distant in the water, as the line is reeled in the bobber slides down the line until it contacts the sinker 22. The bobber-sinker combination, which is now immediately adjacent to the tip of the rod, is then cast the desired distance, following which the sinker 22 draws the line through the bobber until the knot 20 engages the upper end of the stem 10, as shown in Fig. 1. The bobber is pulled upright in the water and sufficient line is provided between the bobber and the spinning rod so that the bobber may drift over a relatively large area, carrying the bait directly therebelow.

As has already been described, the only buoyant portion of the bobber is the body 14. The fins and the stem are non-buoyant and therefore do not add materially to the buoyancy of the bobber, especially when a fish attacks the bait. Preferably, the bobber is used in such a manner that the buoyant body 14 is almost completely submerged. The fins 12 as well as the upper stem portion being non-buoyant, they will contribute substantially no resistance to submergence of the bobber when a fish attacks the bait. Certain species of fish do not vigorously attack the bait, but instead gently carry the bait to a distant point before finally swallowing it. By using the bobber as just explained, such a fish can submerge the bobber very easily as it possesses but little buoyancy. If the fish desires to run with the bait, the bobber presents little drag inasmuch as the vanes 12 maintain the bobber aligned with the direction in which the fish is swimming.

In addition to keeping the bobber aligned in the water for presenting minimum drag, the three fins also serve to guide the bobber through the air both vertically and horizontally as it is being cast out, which permits the bobber to be cast a maximum distance.

As shown in Fig. 3, the bobber is composed of two pieces, one piece being the buoyant body 14 and the other being the stem-fin assembly. However, the bobber may be fabricated as a single unit by molding the body, stem and fins as a single unit, with the body portion 14 being made hollow so it will float. With the bobber made according to the two-piece construction of Fig. 3, it is possible to use bodies 14 of different sizes. This is important as it permits changing the bobber buoyancy to suit the attacking characteristics of the species of fish being sought and to suit the particular bait being used.

As an additional feature, my improved design provides maximum visibility inasmuch as the use of three or more opaque fins 12 always presents a maximum surface for viewing to the fisherman. This visibility feature is in direct contrast with the use of only two fins diametrally arranged such that when the bobber turns to align the plane of the vanes with line of sight, they are hardly visible. Three or more vanes arranged as disclosed herein always present a maximum surface area for observation.

What is claimed is:

1. A fishing bobber comprising a hollow, elongated, straight stem made of non-buoyant material, at least three radially outwardly and axially extending fins secured to an end portion of said stem, said fins having a length equal to about one-third of the length of said stem, said fins spaced apart by substantially equal angular amounts and being of relatively thin and solid non-buoyant material, a buoyant body circular in cross-section having a length substantially equal to a third of the length of said stem, said body having a coaxial bore frictionally receiving said stem and positioned adjacent to said fins, approximately one-third of said stem length extending beyond said body, thereby providing a moment arm having use in standing the bobber upright in the water.

2. The fishing bobber of claim 1 and including a fishing line passing through said stem to receive a sinker on the end which extends from said moment arm, said line having a stop which is too large to pass through said stem, said stop being adjacent to and engageable with the end of said stem adjacent to said fins, said sinker having a weight which causes said body to submerge in water to a point adjacent to the upper end of said body.

References Cited in the file of this patent

UNITED STATES PATENTS

| 322,088 | Behrens | July 14, 1885 |
| 2,734,303 | Peck et al. | Feb. 14, 1956 |

FOREIGN PATENTS

| 413,597 | Great Britain | July 19, 1934 |
| 1,143,058 | France | Apr. 8, 1957 |